(12) United States Patent
Lee et al.

(10) Patent No.: US 8,508,685 B2
(45) Date of Patent: Aug. 13, 2013

(54) BACKLIGHT ASSEMBLY AND DISPLAY APPARATUS HAVING THE SAME

(75) Inventors: Jaesang Lee, Cheonan-si (KR); Kwang-Wook Choi, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 224 days.

(21) Appl. No.: 13/094,666

(22) Filed: Apr. 26, 2011

(65) Prior Publication Data

US 2012/0075552 A1 Mar. 29, 2012

(30) Foreign Application Priority Data

Sep. 29, 2010 (KR) .................. 10-2010-0094619

(51) Int. Cl.
*G02F 1/1333* (2006.01)
(52) U.S. Cl.
USPC ............................................. 349/58; 349/65
(58) Field of Classification Search
USPC .................................................... 349/58, 65
See application file for complete search history.

(56) References Cited

U.S. PATENT DOCUMENTS

2003/0179580 A1* 9/2003 Ito et al. ................... 362/306
2005/0243573 A1* 11/2005 Kim et al. ................. 362/600

FOREIGN PATENT DOCUMENTS

| JP | 2001-210128 A | 8/2001 |
| JP | 2004-349020 A | 12/2004 |
| KR | 1020050033962 A | 4/2005 |
| KR | 1020050105387 A | 11/2005 |

* cited by examiner

*Primary Examiner* — Phu Vu
(74) *Attorney, Agent, or Firm* — Innovation Counsel LLP

(57) ABSTRACT

A backlight assembly includes a light source part, a light guide plate, a container, and a support member. The light source part has a light emitting surface to emit light, and the light guide plate has a light incident surface to guide light. The container includes a bottom portion and sidewalls to receive the light source part and the light guide plate. The support member pushes the light guide plate toward the bottom portion to more closely maintain the position of the light incident surface with respect to the light emitting surface. This helps to prevent misalignment between the light exist surface and the light incident surface, maintaining the quantity of light supplied to the light guide plate.

18 Claims, 7 Drawing Sheets

BACKLIGHT ASSEMBLY AND DISPLAY APPARATUS HAVING THE SAME

CROSS-REFERENCE TO RELATED APPLICATION

This application claims priority to, and the benefit of, Korean Patent Application No. 10-2010-0094619 filed on Sep. 29, 2010, the contents of which are herein incorporated by reference in their entirety.

BACKGROUND

1. Field of Disclosure

Embodiments of the present invention relate generally to flat panel displays. More particularly, embodiments of the present invention relate to a backlight assembly for a flat panel display apparatus capable of improving display quality, and a display apparatus having the backlight assembly.

2. Description of the Related Art

Flat panel displays have found increasing acceptance due to their low profile. However, ongoing efforts exist to make such displays thinner. In particular, efforts continue to reduce the thickness of light guide plates, one common component of flat panel displays.

However, in general, since the light guide plate includes polymer resin, the outer portion of the light guide plate increasingly risks deformation due to external temperature and/or moisture as the thickness of the light guide plate is reduced. Accordingly, the quantity of light guided by the light guide plate is reduced and its direction is altered, so that the display quality of the display apparatus is deteriorated.

SUMMARY

Exemplary embodiments of the present invention provide a backlight assembly for a display apparatus, where this assembly is capable of improving the display quality of the display apparatus.

Exemplary embodiments of the present invention also provide a display apparatus having the backlight assembly.

According to the exemplary embodiments, a backlight assembly includes a light source part, a light guide plate, a container, and a support member. The light source part has a light emitting surface. The light guide plate has at least one light incident surface facing the light emitting surface, so as to receive light from the light source part. The container includes a bottom portion and sidewalls to receive the light source part and the light guide plate. The support member extends from an upper portion of the light source part toward the light guide plate to apply pressure to a side portion of the light guide plate, so as to facilitate a maintaining of a position of the light incident surface with respect to the light emitting surface.

According to the exemplary embodiments, a display apparatus includes a display panel and a backlight assembly. The display panel is positioned to receive light so as to display an image. The backlight assembly is configured to supply the light to the display panel.

The backlight assembly includes a light source part which has a light emitting surface, a light guide plate with at least one light incident surface facing the light emitting surface so as to receive the light from the light source part, a container which includes a bottom portion and sidewalls to receive the light source part and the light guide plate, and a support member which extends from an upper portion of the light source part toward the light guide plate to apply pressure to a side portion of the light guide plate, so as to facilitate a maintaining of a position of the light incident surface with respect to the light emitting surface.

As described above, since the support member presses the light guide plate toward the container, even if the outer appearance of the light guide plate is deformed due to temperature and/or moisture, the position of the light incident surface of the light guide plate is more adequately maintained. Accordingly, the quantity of light supplied to the light guide plate can be prevented from being reduced due to misalignment between the light exiting surface of the light source and the light incident surface of the light guide plate.

In addition, when the support member includes metal having superior conductivity, heat emitted from the light source can be more easily dissipated to the outside through the support member and the receiver connected to the support member. Accordingly, the outer appearance of the light guide plate can be more readily prevented from being deformed due to the temperature of the light guide plate.

DETAILED DESCRIPTION

Figure 1:
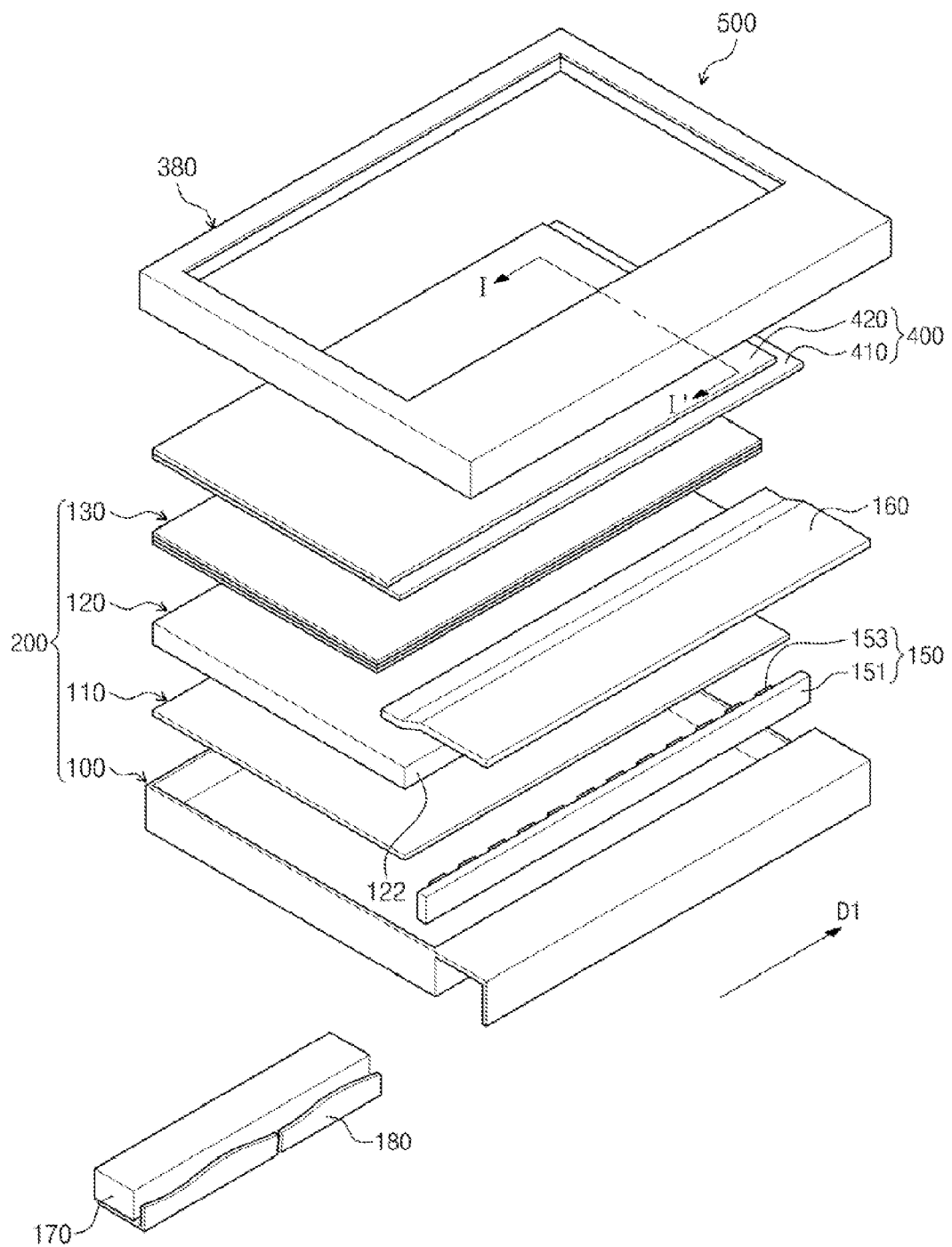
FIG. 1 is an exploded perspective view showing a display apparatus according to an exemplary embodiment of the present invention.

Hereinafter, embodiments of the present invention will be explained in detail with reference to the accompanying drawings. However, the scope of the present invention is not limited to such embodiments and the present invention may be realized in various forms. The embodiments to be described below are nothing but the ones provided to bring the disclosure of the present invention to perfection and assist those skilled in the art to completely understand the present invention. The present invention is defined only by the scope of the appended claims. In addition, the size of layers and regions shown in the drawings can be simplified or magnified for the purpose of clear explanation. Also, the same reference numerals are used to designate the same elements throughout the drawings. All spatial and spatially relative terms are approximate, and the invention includes variations of any such terms.

Figure 2:
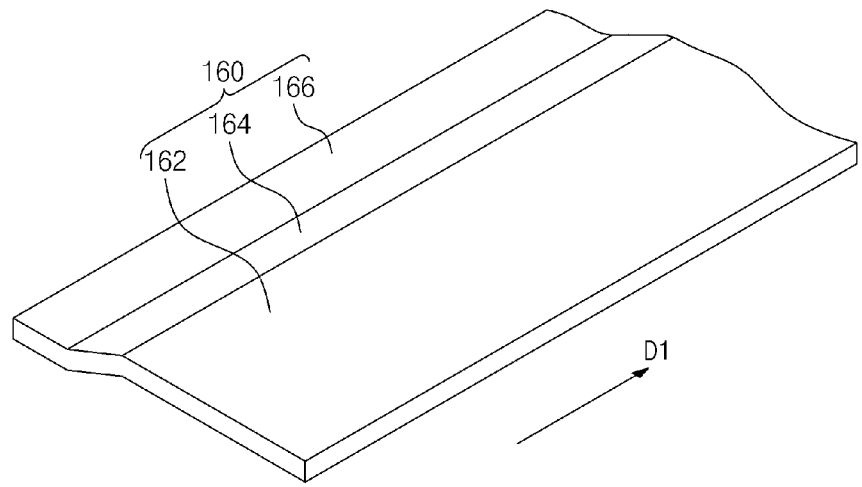
FIG. 2 is a perspective view showing a support member of FIG. 1.
Figure 3:
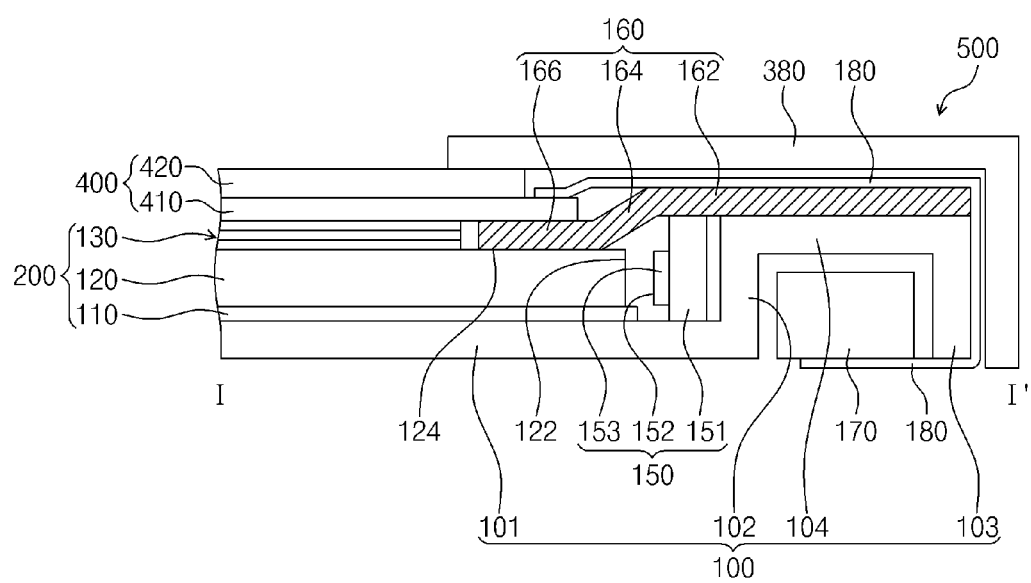
FIG. 3 is a cross-sectional view taken along a line I-I' of FIG. 1.

FIG. 1 is an exploded perspective view showing a display apparatus 500 according to an exemplary embodiment of the present invention, and FIG. 2 is a perspective view showing a support member of FIG. 1. FIG. 3 is a cross-sectional view taken along a line I-I' of FIG. 1.

Referring to FIGS. 1, 2, and 3, the display apparatus 500 includes a backlight assembly 200 and a display panel 400 to receive light from the backlight assembly 200, so as to display an image.

The backlight assembly 200 includes a container 100, a reflective plate 110, a light source 150, a support member 160, a light guide plate 120, and optical sheets 130.

The container 100 includes a bottom surface 101 and a plurality of sidewalls extending generally upward from the bottom surface 101 to receive components of the backlight assembly 200. Hereinafter, the structure of the container 100 according to an exemplary embodiment of the present invention will be described in more detail with reference to FIGS. 1 to 3.

When a sidewall adjacent and parallel to the light source 150 is defined as a first sidewall 102, the container 100 includes an upper end portion 104 extending from an upper portion of the first sidewall 102 generally parallel to the bottom surface 101, and a second sidewall 103 extending from the upper end portion 104 generally parallel to the first sidewall 102. Therefore, the container 100 provides a space defined by the first sidewall 102, the second sidewall 103, and the upper end portion 104. A second printed circuit board 170, which will be described later, is positioned at least partially within this space.

The light source 150 includes a first printed circuit board 151 and a plurality of light sources 153 mounted thereon. The printed circuit board 151 extends in a first direction D1 along a light incident surface 122 of the light guide plate 120, and the light sources 153 are arranged at predetermined intervals in the first direction D1.

Each light source 153 has a light emitting surface 152 that emits light, and that faces the light incident surface 122. According to the present exemplary embodiment as shown in FIG. 3, the light sources 153 include light emitting diodes. According to another exemplary embodiment, the light sources 153 may include organic light emitting diodes (OLEDs) or a line light source such as a cold cathode fluorescent lamp (CCFL) instead of the light sources. Any suitable light source is contemplated.

The reflective plate 110 includes a reflective material, such as polyethylene terephthalate (PET) or aluminum, to reflect light. The reflective plate 110 is provided on the bottom surface 101. The reflective plate 110 reflects leaking light, which is not incident to the light guide plate 120 from the light sources 150, toward the light guide plate 120, thereby increasing the quantity of the light.

The light guide plate 120 is provided on the reflective plate 110 and received in the container 100. The light guide plate 120 has a light incident surface 122 shown here as the side of light guide plate 120 that faces the light sources 153. The light guide plate 120 guides the light from the light sources 150 to the display panel 400. According to the present exemplary embodiment as shown in FIGS. 1 to 3, the light guide plate 120 may have a thickness of about 3.0 mm. In this case, the thickness of the light guide plate 120 may be substantially identical to the width of the light emitting surface 152 of each light source 153.

The optical sheets 130 are provided on the light guide plate 120. The optical sheets 130 may include a prism sheet and a diffusion sheet. The prism sheet collects the light emitted from the upper surface of (i.e., guided by) the light guide plate 120 to travel toward the display panel 400, thereby improving the brightness of the front surface of the display apparatus 500. In addition, the diffusion sheet diffuses the light from the light guide plate 120 for more uniform illumination of the display panel 400. Any type and number of optical sheets 130 are contemplated.

The display panel 400 includes a first substrate 410, and a second substrate 420 facing the first substrate 410. The first substrate 410 may include a plurality of pixels (not shown), and each pixel may include a thin film transistor (not shown) and a pixel electrode (not shown) electrically connected to the thin film transistor. The second substrate 420 may include color filters (not shown) in one-to-one correspondence with the pixels, and a common electrode (not shown) to form an electric field with the pixel electrode. The invention also contemplates any other configuration of display panel 400.

In the present exemplary embodiment, the display panel 400 may include liquid crystal interposed between the first substrate 410 and the second substrate 420. The direction of the liquid crystal interposed between the first and second substrates 410 and 420 is controlled by an electric field formed between the pixel electrode and the common electrode, thereby adjusting the quantity of light transmitted through the first and second substrates 410 and 420.

The display apparatus 500 further includes a second printed circuit board 170 and a flexible printed circuit board 180. The second printed circuit board 170 generates a driving signal to drive the display panel 400, and may be received in the space defined by the first sidewall 102, the second sidewall 103, and the upper end portion 104 as described above.

The flexible printed circuit board 180 electrically connects the second printed circuit board 170 to the first substrate 410. Accordingly, the driving signal can be supplied to the display panel 400 through the flexible printed circuit board 180. Meanwhile, since the printed circuit board 180 is flexible, the flexible printed circuit board 180 is bent along the second sidewall 103 and the upper end portion 104, to be electrically connected to the first substrate 410.

The support member 160 may include metallic material having superior thermal conductivity, and preferably may include one of aluminum and an alloy thereof. The support member 160 extends over an upper portion of the light source 150 toward the light guide plate 120, to support a side portion 124 of a top surface of the light guide plate 120. The side portion 124 is defined as a region adjacent to the light incident surface 122.

According to the exemplary embodiments as shown in FIGS. 1 to 3, the support member 160 includes a coupling portion 162, an inclined portion 164, and a supporting portion 166. The coupling portion 162 extends from a position over the upper portion of the light source 150 to the sidewall 103. In addition, the inclined portion 164 extends from the coupling portion 162 at an angle with respect to the coupling portion 162, so as to be connected to the supporting portion 166. The inclined portion 164 is inclined with respect to the coupling portion 162 or the supporting portion 166 when viewed in cross-section.

The coupling portion 162 is coupled to the upper end portion 104 of container 100 by any suitable manner, such as by affixing to the upper end portion 104 by an adhesive, a weld, or a solder. In this manner, the supporting portion 166 applies pressure to the side portion 124 of the light guide plate 120, pressing it toward the bottom surface 101, to maintain the position of the light guide plate 120 within the container 100. Accordingly, the light incident surface 122 of the light guide plate 120 is maintained in a more fixed position.

Hereinafter, the function of the support member 150 according to the present exemplary embodiment will be described.

In general, the light guide plate 120 includes polymethylmethacrylate (PMMA) having a refractive index which is about 1.5 times greater than the refractive index of air. When the light guide plate 120 has a thickness of about 3.0 mm or less, the outer appearance of the light guide plate 120 may be deformed due to heating or moisture/humidity. Deformation of the light guide plate 120 may result in misalignment between the light incident surface 122 and the light emitting surface 152. This misalignment reduces the quantity of light supplied to the light guide plate 120 from the light emitting surface 152.

However, according to the exemplary embodiment of FIGS. 1 to 3, since the support member 160 presses the side portion 124 against the container 100, even if the outer appearance of the light guide plate 120 is deformed due to temperature or moisture, the light incident surface 122 is kept from becoming misaligned with the light emitting surface 152. That is, the downward pressure exerted on the light guide plate 120 by the support member 160 reduces or eliminates deformation of the light guide plate 120, in turn reducing or eliminating misalignment between the surfaces 122 and 152 and thus better maintaining the positions these two surfaces with respect to each other. Accordingly, the quantity of the light incident to the light incident surface 122 may be maintained even under conditions of high temperature and/or moisture. In addition, since the support member 160 may include metallic material, particularly, one of aluminum and an alloy thereof, the support member 160 may have a light reflective function. This allows the support member 160 to both prevent light emitted from the light source 150 from leaking, while also reflecting the light, thereby increasing the quantity of the light incident to the light incident surface 122.

Meanwhile, the cover member 380 has an open central portion corresponding to a display region (see A1 of FIG. 4A and FIG. 4B) of the display panel 400. The cover member 380 is coupled to the container 100, so that the components received in the container 100 are more securely held within the container 100.

Figure 4A:
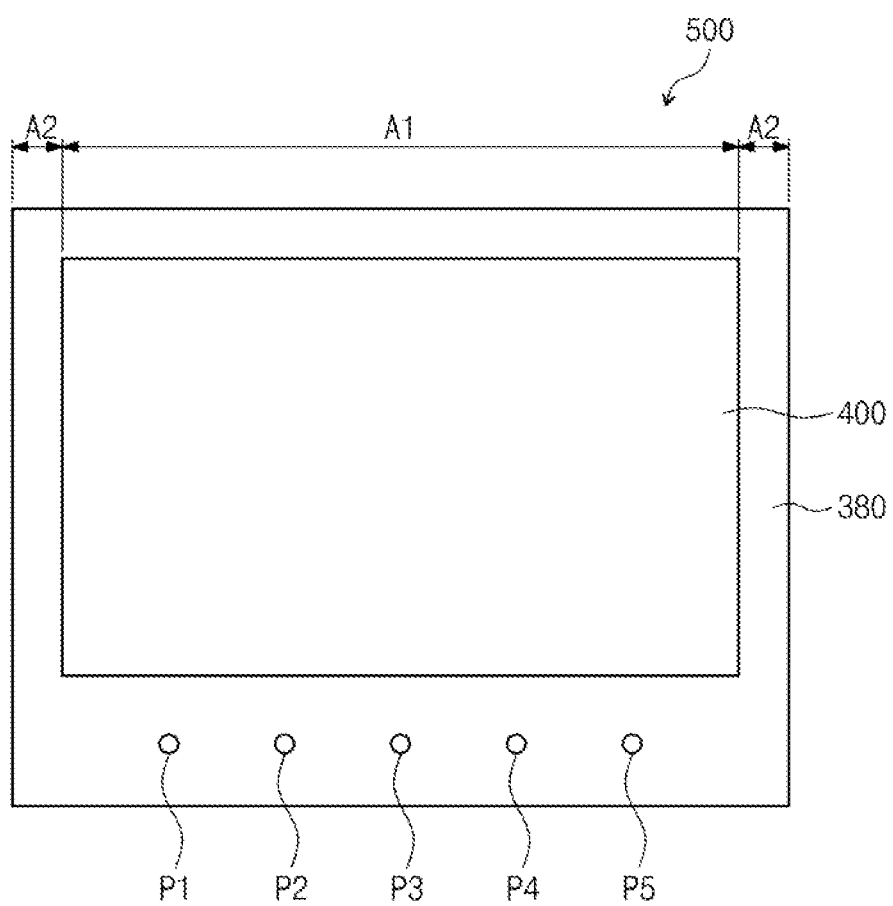
FIGS. 4A to 4C are views showing the effects of the present invention.
Figure 4B:
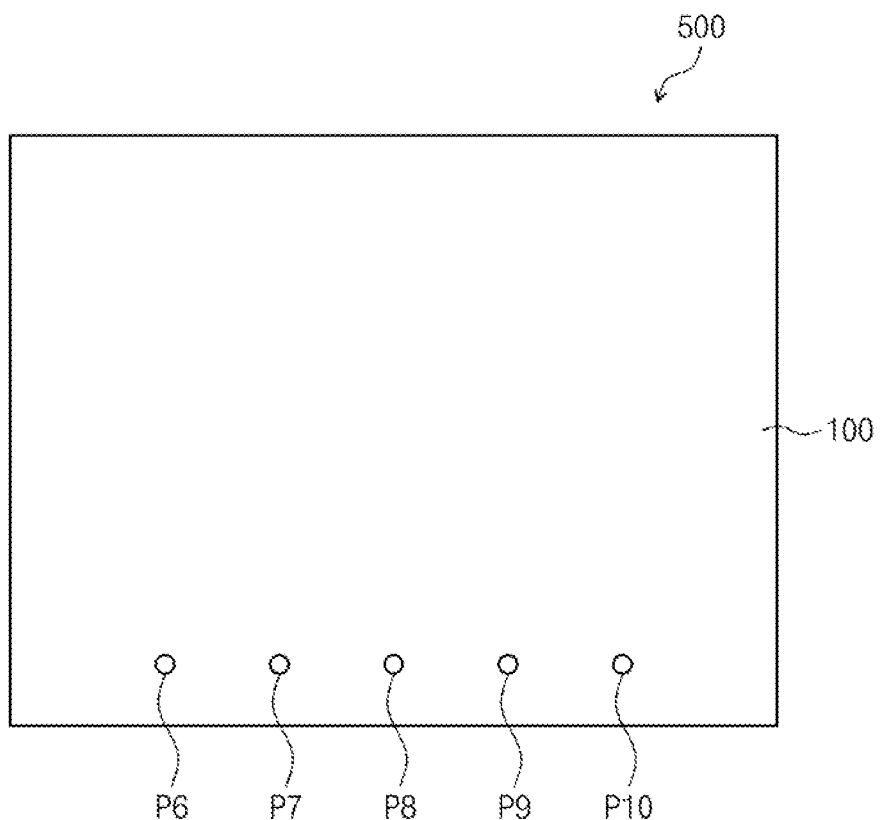
Figure 4C:
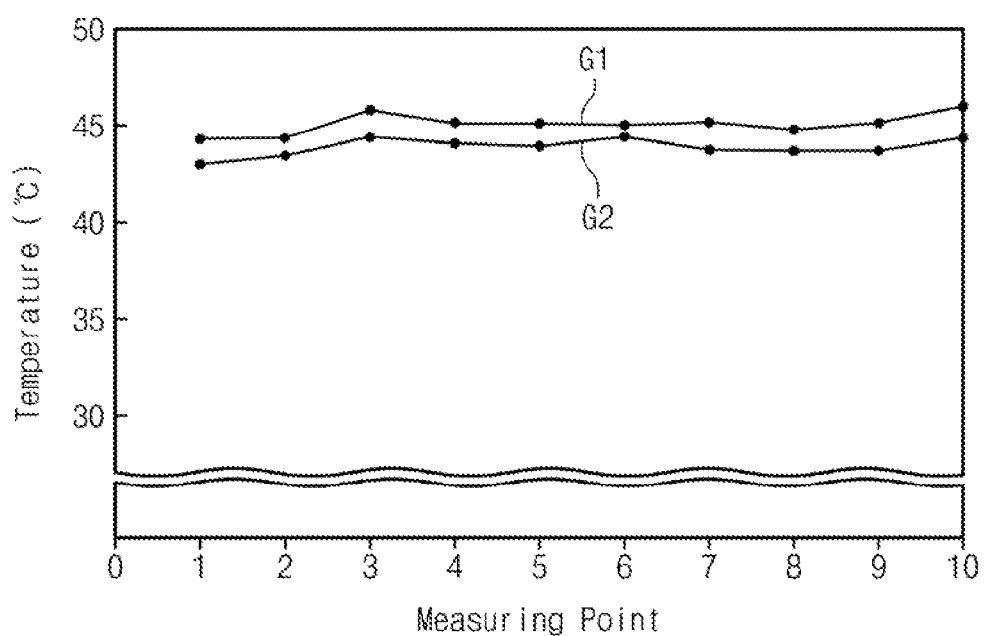

FIGS. 4A, 4B, and 4C are views showing effects of the present invention. In more detail, FIGS. 4A and 4B show first to tenth points P1 to P10 at which the temperatures of the display apparatus 500 were measured. FIG. 4C shows temperature measurements taken at the first to tenth points P1 to P10 to measure the effectiveness of the exemplary embodiment of the present invention shown in FIGS. 1 to 3.

Referring to FIGS. 4A and 4B, the display apparatus 500 has display region A1 on which an image is displayed, and a bezel region A2 surrounding the display region A1. The first to fifth points P1 to P5 are positioned in the bezel region A2 of the cover member 380, and the sixth to tenth points P6 to P10 are positioned in the bezel region A2 of the container 100. Although not shown in FIGS. 4A and 4B in detail, the support member 160 (see FIG. 3) is received in the container 100 corresponding to the bezel region A2.

Referring to FIG. 4C, the first graph G1 represents temperatures measured at the first to tenth points P1 to P10 when a display apparatus according to the comparison example of the present invention is driven, but does not include the support member 160. The second graph G2 represents the temperatures measured at the first to tenth points P1 to P10 when the display apparatus 500 includes the support member 160.

Referring to the first graph G1, among temperatures measured at the first to tenth points P1 to P10, the minimum temperature is about 42.9° C., the maximum temperature is about 46.5° C., and the average temperature is about 44.4° C. Referring to the second graph G2, among temperatures measured at the first to tenth points P1 to P10, the minimum temperature is about 42.0° C., the maximum temperature is about 44.1° C., and the average temperature is about 42.9° C.

Referring to FIG. 3 again, when the display apparatus 500 includes support member 160, heat emitted from the display panel 400 and the first printed circuit board 151 can be more easily dissipated to the outside through the container 100. That is, the support member 160 conducts heat away from the light sources 150. Accordingly, the deformation of the light guide plate 120 caused by heat can be prevented by the support member 160. Additionally, pressure from the support member 160 helps prevent the light incident surface 122 from being misaligned with the light emitting surface 152 due to the deformation of the light guide plate 120 caused by heat. For both these reasons, tests confirm that embodiments of the invention reduce misalignment between the surfaces 122 and 152, thus preventing reduction in the quantity of light incident to the light incident surface 122 with temperature and/or moisture.

Figure 5:
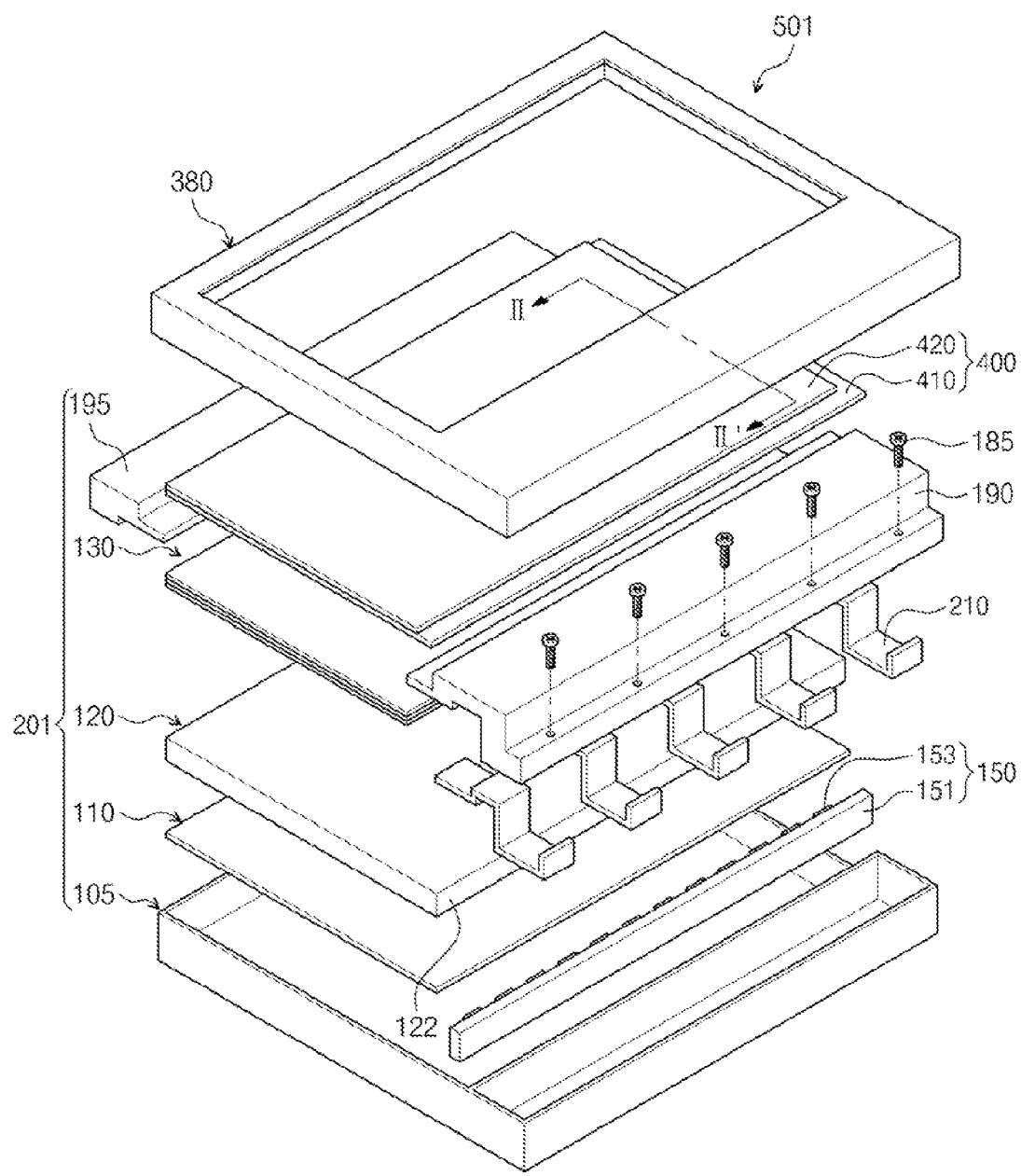
FIG. 5 is an exploded perspective view showing a display apparatus according to another exemplary embodiment of the present invention.
Figure 6:
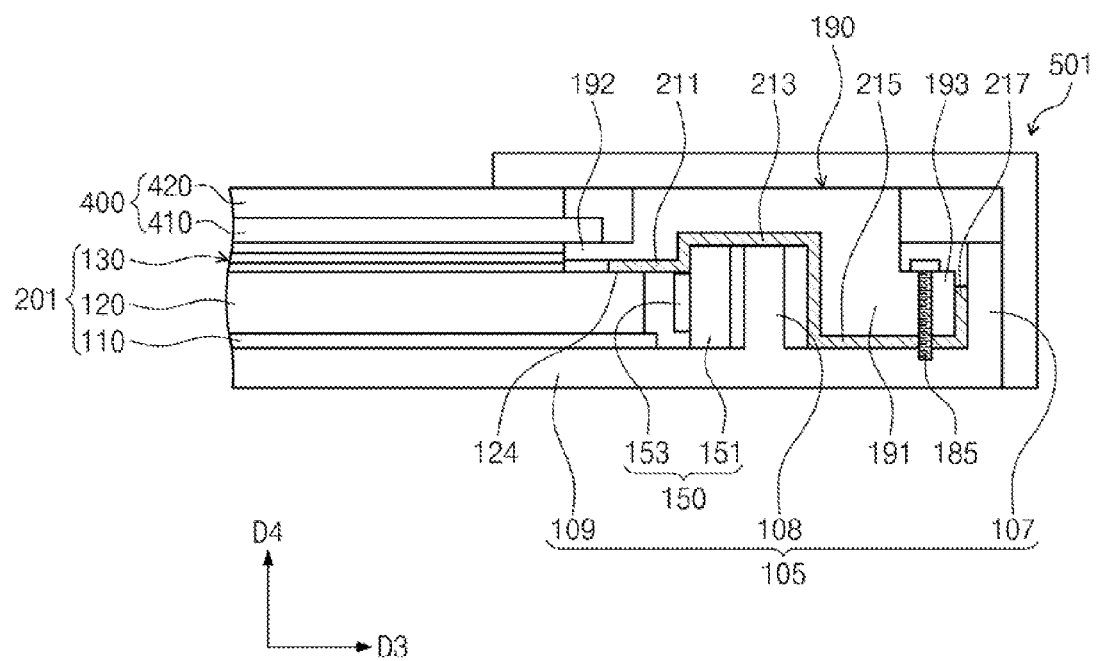
FIG. 6 is a cross-sectional view taken along a line II-II' of FIG. 5.
Figure 7:
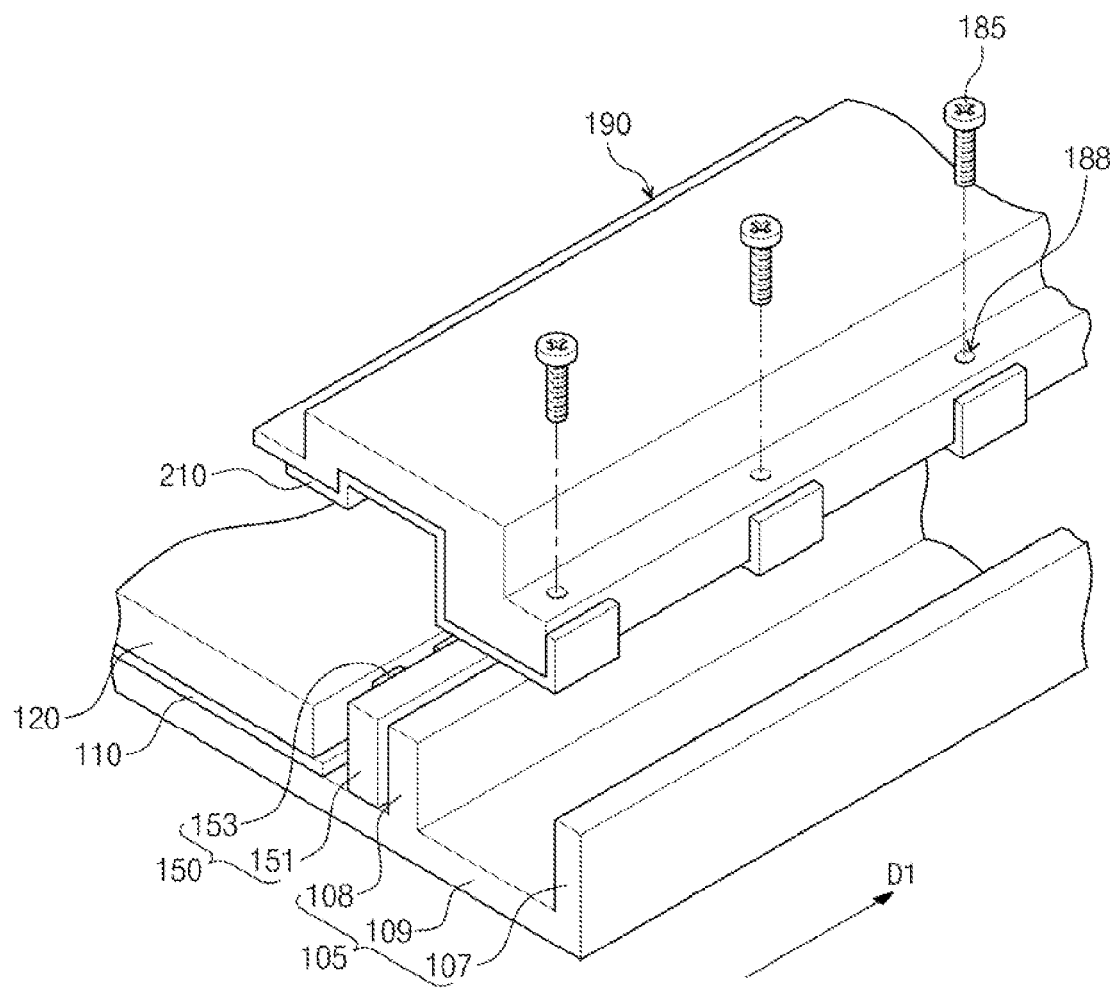
FIG. 7 is an exploded perspective view showing an assembling of a light guide plate, a light source, a first mold fame, a support member, and a receiver of FIG. 5.

FIG. 5 is an exploded perspective view showing a display apparatus according to another exemplary embodiment of the present invention, and FIG. 6 is a cross-sectional view taken along line II-II' of FIG. 5. FIG. 7 is an exploded perspective view showing the bonding of a light guide plate, a light source, a first mold frame, and a support member shown in FIG. 5. Hereinafter, the display apparatus will be described with reference to FIGS. 5, 6, and 7, and like reference numbers refer to elements that are largely the same as those of FIGS. 1, 2, and 3. In addition, the structures and components that are largely the same as those of FIGS. 1, 2, and 3 will not be further described, in order to avoid redundancy.

Referring to FIGS. 5, 6, and 7, a display apparatus 501 includes a backlight assembly 201 and the display panel 400 receiving the light from the backlight assembly 201 to display an image.

The backlight assembly 201 includes a container 105, a reflective plate 110, the light source 150, a plurality of support members 210, the light guide plate 120, a first mold frame 190, a second mold frame 195, and the optical sheets 130.

The container 105 includes a bottom surface 109 and a plurality of sidewalls extending from the bottom surface 109, and receives components of the backlight assembly 201. In more detail, two sidewalls adjacent to the light source 150 and arranged in parallel to each other are defined as first and second sidewalls 107 and 108. The first and second sidewalls 107 and 108 are spaced apart from each other, and are connected to the bottom surface 109.

The first mold frame 190 is adjacent to one of the longer sides of the display panel 400 to support the bottom surface of the display panel 400. The second mold frame 195 is positioned adjacent to another longer side to also support the bottom surface of the display panel 400.

According to another exemplary embodiment of the present invention as shown in FIGS. 5, 6, and 7, the first mold frame 190 is coupled to a plurality of support members 210 to support one side portion of the light guide plate 120 to the container 105 in a somewhat different manner from the second mold frame 195. Hereinafter, the structure of the first mold frame 190 will be described in more detail.

The first mold frame 190 includes a body 191, a panel support part 192, and a hook part 193. The body 191 is interposed between the first sidewall 107 and the second sidewall 108 and provided on the bottom surface 109. The panel support part 192 extends from the body 191 to support a portion of the bottom surface of the display panel 400. In addition, the hook part 193 extends from the body 191 toward the first sidewall 107.

Meanwhile, the support members 210 include a material having good thermal conductivity, such as aluminum or an alloy thereof, and apply pressure to the side portion 124 of the light guide plate 120. Since the support members 210 each have substantially the same structure, only one support member will be described as an example with reference to FIG. 6 below. The support members 210 each have the same reference number.

The support member 210 includes a support part 211 to support the side portion 124 of the light guide plate 120, a first coupling part 213 extending from the support part 211 and coupled to the first mold frame 190 and the second sidewall 108, a second coupling part 215 extending from the first coupling part 213 and coupled to the bottom surface 109 and the body 191, and a third coupling part 217 extending from the second coupling part 215 and coupled to the hook part 193.

The coupling member 185 is coupled to the coupling groove 188 to fix the hook part 193 and the third coupling part 217 to the bottom surface 109. Accordingly, the support member 210 may be affixed to the container 105 together with the first mold frame 190.

Similarly to the support member (see 160 of FIG. 1) described with reference to FIGS. 1 to 3, the support member 210 having the above structure presses the side portion 124 onto the container 105. Accordingly, even if the light guide plate 120 is deformed due to temperature and/or moisture, the position of the light incident surface 122 is fixed by the support member 210, so that misalignment between the light incident surface 122 and the light emitting surface 152 can be reduced or prevented.

Additionally, when the support member 210 shown in FIGS. 5 to 7 includes aluminum or some alloy thereof having superior thermal conductivity, the heat from the light source 150 can be more easily dissipated to the outside through the container 105 as described with reference to FIGS. 4A to 4C. This helps to reduce deformation of the light guide plate 120, which helps further reduce misalignment between surfaces 122 and 152.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
   a light source part having a light emitting surface;
   a light guide plate having at least one light incident surface so as to receive light from the light source part;
   a container including a bottom portion and sidewalls to receive the light source part and the light guide plate; and
   a support member extending from an upper portion of the light source part toward the light guide plate to apply pressure to an edge portion of the light guide plate to maintain a position of the light guide plate within the container,
   wherein the support member comprises:
      a support portion supporting the light guide plate by pressing the edge portion of the light guiding plate toward the bottom portion, the support portion extending substantially parallel to the light guide plate,
      an inclined portion extending obliquely from the supporting portion, and
      a coupling portion extending substantially parallel to the support portion from the inclined portion.

2. The backlight assembly of claim 1, wherein the inclined portion extends upwardly from the support portion.

3. The backlight assembly of claim 2, wherein the support member comprises a metal and has a light reflection surface.

4. The backlight assembly of claim 3, wherein the container comprises:
   a first sidewall;
   an upper end portion extending from an upper portion of the first sidewall generally parallel to the bottom portion; and
   a second sidewall extending from the upper end portion generally parallel to the first side wall,
   wherein the light source part is interposed between the light guide plate and the first sidewall.

5. The backlight assembly of claim 4, wherein the coupling portion is adjacent to the upper end portion and the light source part, so as to conduct heat away from the light source part.

6. The backlight assembly of claim 5, wherein the support member comprises aluminum.

7. The backlight assembly of claim 1, wherein the support member comprises aluminum and has a light reflective surface.

8. A display apparatus comprising:
   a display panel positioned to receive a light so as to display an image; and
   a backlight assembly configured to supply the light to the display panel,
   wherein the backlight assembly comprises:
   a light source part having a light emitting surface;
   a light guide plate having at least one light incident surface so as to receive the light from the light source part;
   a container including a bottom portion and sidewalls to receive the light source part and the light guide plate; and
   a support member extending from an upper portion of the light source part toward the light guide plate to apply pressure to an edge portion of the light guide plate to maintain a position of the light guide plate within the container,
   wherein the support member comprises:
      a support portion supporting the light guide plate by pressing the edge portion of the light guiding plate toward the bottom portion, the support portion extending substantially parallel to the light guide plate,
      an inclined portion extending obliquely from the supporting portion, and
      a coupling portion extending substantially parallel to the support portion from the inclined portion.

9. The display apparatus of claim 8, wherein the inclined portion extends upward from the support portion.

10. The display apparatus of claim 9, wherein the support member comprises a metal and has a light reflective surface.

11. The display apparatus of claim 10, wherein the container comprises:
    a first sidewall;
    an upper end portion extending from an upper portion of the first sidewall while being generally parallel to the bottom portion; and
    a second sidewall extending from the upper end portion while being generally parallel to the first side wall,
    wherein the light source part is interposed between the light guide plate and the first sidewall.

12. The display apparatus of claim 11, further comprising a second printed circuit board electrically connected to the display panel to supply power to the display panel, wherein the second printed circuit board is received at least partially within a space defined by the first sidewall, the upper end portion, and the second sidewall.

13. The display apparatus of claim 11, wherein the coupling portion is adjacent to the upper end portion and the light source part, so as to conduct heat away from the light source part.

14. The display apparatus of claim 8, further comprising a mold frame extending generally parallel to at least one of the sidewalls of the container to support a bottom surface of the display panel, wherein the support member is interposed between the mold frame and the bottom portion.

15. The display apparatus of claim 14, wherein the mold frame comprises:
   a body;
   a panel supporting portion extending from the body to support the bottom surface of the display panel; and
   a hook portion extending from the body toward one of the sidewalls, and
   wherein the support member further comprises:
   a supporting portion interposed between the panel supporting portion and the light guide plate to apply pressure to the side portion of the light guide plate; and
   a coupling portion extending from the supporting portion and coupled to the hook portion.

16. The display apparatus of claim 15, further comprising a plurality of the support members arranged along the side portion of the light guide plate.

17. The display apparatus of claim 15, further comprising a coupling member coupling both the hook portion and the coupling portion to the bottom portion.

18. The display apparatus of claim 8, wherein the support member at least partially supports the display panel.

* * * * *